United States Patent

Maida

[15] 3,703,649
[45] Nov. 21, 1972

[54] TIMER FOR A CAMERA

[72] Inventor: Osamu Maida, Tokyo, Japan

[73] Assignee: Nippon Kogaku, K.K., Tokyo, Japan

[22] Filed: Sept. 29, 1971

[21] Appl. No.: 184,781

[30] Foreign Application Priority Data

Sept. 30, 1970 Japan..................45/85415

[52] U.S. Cl. ................307/293, 95/10 CT, 95/53.3, 307/228, 328/127, 328/151
[51] Int. Cl. .............................................H03k 5/13
[58] Field of Search...............95/10 CT, 10 CE, 53.3; 307/228, 293; 328/127, 151; 352/121

[56] References Cited

UNITED STATES PATENTS

| | | | |
|---|---|---|---|
| 3,388,346 | 6/1968 | Roof et al. | 307/293 X |
| 3,414,739 | 12/1968 | Paidosh | 307/293 X |
| 3,594,747 | 7/1971 | Cronin | 95/31 EL |
| 3,657,558 | 4/1972 | Patrickson | 307/228 |

*Primary Examiner*—Herman Karl Saalbach
*Assistant Examiner*—R. C. Woodbridge
*Attorney*—Joseph M. Fitzpatrick et al.

[57] ABSTRACT

A timer circuit for actuating a camera including first and second timing circuits and first and second start control circuits. Each timing circuit consists of an integration time constant circuit having a resistor and a capacitor connected in series, a level detecting and trigger circuit and a hold circuit. The first and second start control circuits are interconnected between a power source and the first and second timing circuits, respectively, in such a manner that each start control circuit is connected or disconnected by a control signal derived from the other start control circuit. The timing circuits are alternately actuated by said start control circuits, and the outputs from the two timing circuits are applied to an AND gate to generate an actuating signal for controlling the camera. Switches are provided in the timer circuit so as to selectively establish said timer circuit in one of various modes of operation.

10 Claims, 3 Drawing Figures

TIMER FOR A CAMERA

BACKGROUND OF THE INVENTION

1. Field of the Invention

The present invention relates to an improved timer which controls the operation of a camera and is capable of serving various functions.

2. Description of the Prior Art

Photography is one of the most important and effective tools in scientific and technical fields and various photographic techniques are employed in such fields as the application demands. For example, in order to record the growth of animals, plants or crystals, or record the process of cell division and the like, all of which generally take place over an extended time, photographic pictures are taken of the subject repetitively at a predetermined time interval so that the entire process of growth or division can be observed by comparison of such pictures. For motion and method studies, one or a few picture frames are photographed or an exposure of photographic film for a predetermined time is carried out repetitively at a predetermined time interval. Sometimes it is desirable to record the change of an object, such as a mass, undergoing thermal expansion within a predetermined time or to expose a motion-picture film for one cut having a predetermined time interval. Furthermore, it is desirable in some applications to provide a long exposure time by using the bulb of the camera shutter which may be actuated by an electromagnetically-actuated trigger or the like. In addition sometimes so-called time delayed photography is used in order to permit a camera operator who is, for example, swimming or skiing, to picture himself in the resultant photograph. In this latter case, the motion picture camera must be started at a predetermined time after it is set and also stopped after a predetermined time.

SUMMARY OF THE INVENTION

It is therefore one of the objects of the present invention to provide an electronic timer for use either with a motion picture camera of the type incorporating an electromagnetically-driven shutter release, or with a motor-driven still camera and an attachment such as an electromagnetically-driven trigger which acts upon a shutter release button of the camera so that these cameras and associated attachment may be activated and deactivated by electrical switching signals generated by the electronic timer, whereby various photographic techniques may be selectively, automatically, simply and reliably employed as needs demand.

According to one aspect of the present invention, the electronic timer for a camera may repeat a continuous on-and-off cycle of photographic operations. In short, the timer in accordance with the present invention comprises two timing circuits, each consisting of an integration time constant circuit having a resistor and a capacitor connected in series, a level detecting and trigger circuit and a hold circuit. First and second start control circuits are interconnected between a power source and the first and second timing circuits respectively. The first start control circuit is turned on or off in response to control signals from the second timing circuit and the second start control circuit is turned on or off in response to the control signals from the first timing circuit, in such a way that the two timing circuits may be alternately actuated. The outputs from the two timing circuits are applied to an AND gate to generate an appropriate signal for actuating the camera.

In addition, by making or opening switches in the timer circuitry, one of five timing functions or operational modes may be selected as described hereinafter. The first mode is a repeat mode in which the first actuating output of the timer is generated at a predetermined time after a main switch or power switch is closed and thereafter actuating outputs are repeated at a predetermined time interval until the main switch is opened. The second mode is also a repeat mode similar to the first repeat mode, except that the first actuating output is produced immediately upon the making of the main switch. The third mode is such that only one actuating output is derived from the timer at a predetermined time after the main switch is made. In this mode, the actuating output lasts only for a predetermined time and no other actuating output is produced even if the main switch remains closed. The fourth mode is similar to the third mode, except that the single actuating output occurs immediately upon the closure of the main switch. The fifth mode is such that a single actuating output is produced a predetermined time after the main switch is closed and lasts until the switch is opened thus providing an actuating signal for adjusting the camera to a long exposure time.

Various other objects, features and advantages of the invention will be apparent from the detailed description of the preferred embodiment thereof set forth hereinafter and shown in the accompanying drawings.

DESCRIPTION OF THE PREFERRED EMBODIMENT

Figure 1:
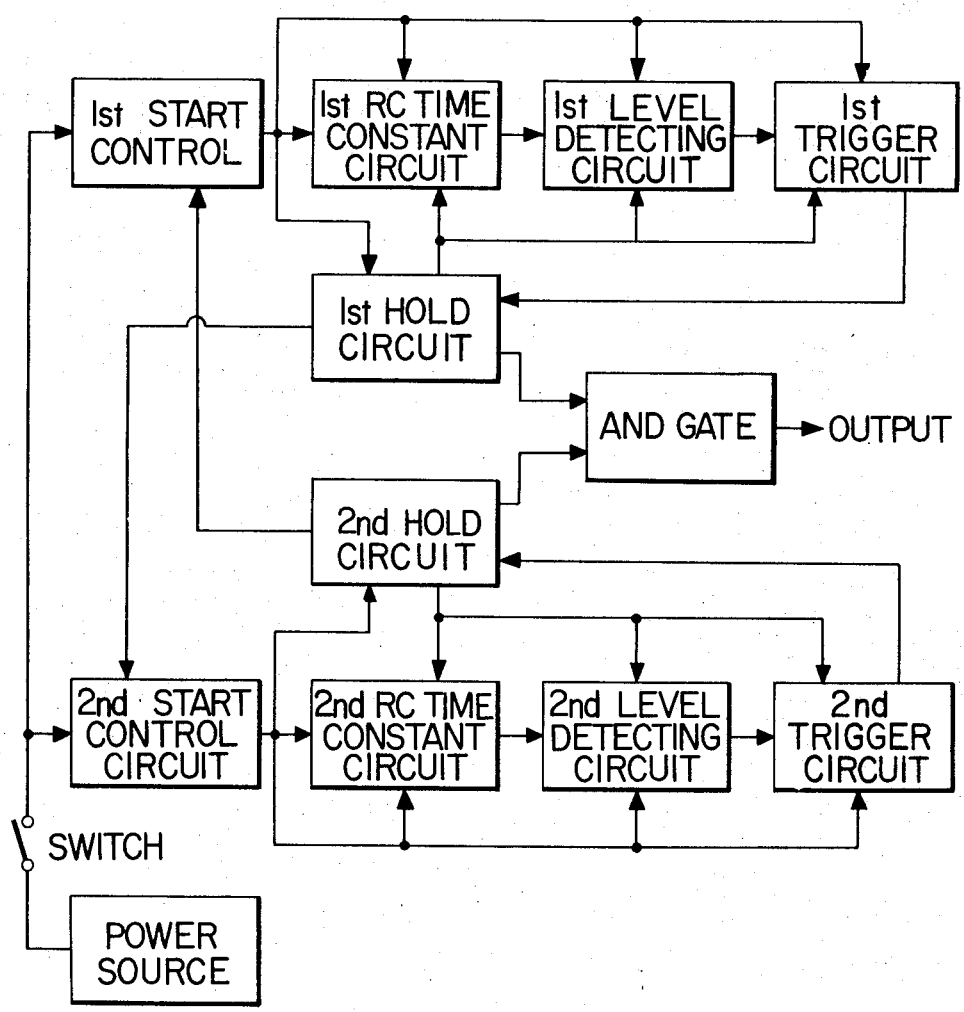
FIG. 1 is a block diagram of one preferred embodiment of an electronic timer for a camera constructed in accordance with the present invention.

Referring to FIG. 1 in more detail, there is shown an electronic timer for actuating a camera (not shown), such as a motion picture camera of the type incorporating an electromagnetically-driven shutter release or a motor-driven still camera having an electromagnetically-driven shutter release. The electronic timer comprises first and second timing circuits, each having a RC time constant circuit, a level detecting circuit for determining when the RC time constant circuit reaches a predetermined charging level, a trigger circuit which generates a trigger pulse in response to the output of the level detecting circuit, and a hold circuit which stores the trigger pulse and maintains the RC time constant circuit, the level detecting circuit and the trigger circuit in predetermined modes of operation.

A first start control circuit is interconnected between the first timing circuit and a source of power for said first circuit. The first start control circuit is adapted to connect and interrupt the source of power to the the first timing circuit in response to a control signal derived from the second timing circuit. Similarly, a second start control circuit is interconnected between the second timing circuit and the same source of power to supply power to the second timing circuit. The second start control circuit is adapted to connect and interrupt the source of power to the second timing circuit in response to a control signal from the first timing circuit. Output signals from the hold circuit of both of the first and second timing circuits are connected to an AND circuit which generates an actuating output for controlling a camera in response to the outputs of the hold circuits.

Figure 2:
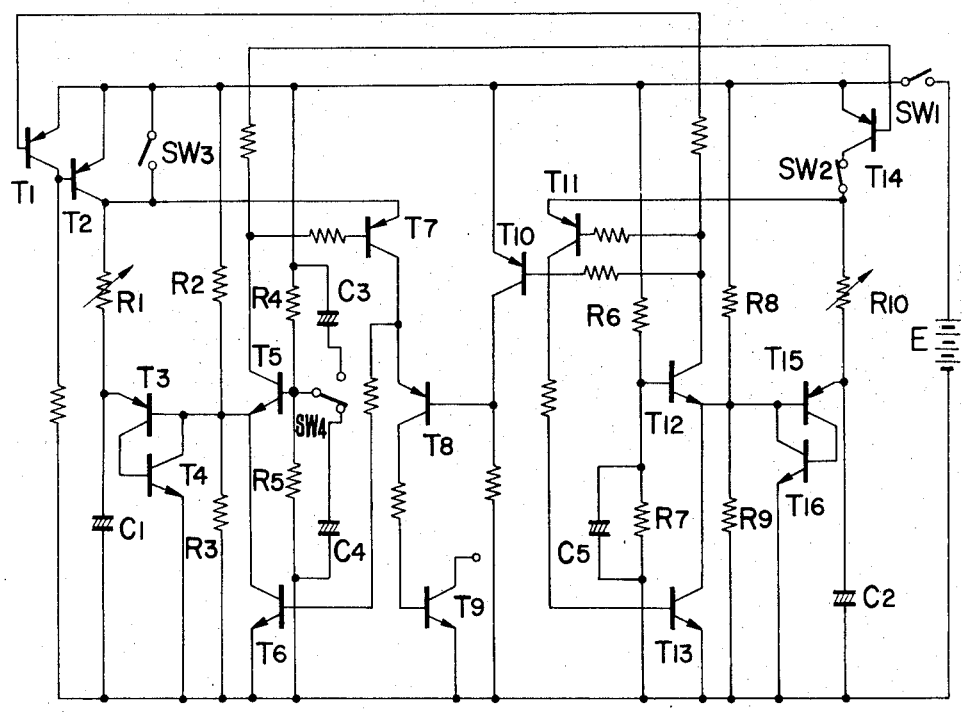
FIG. 2 is a circuit diagram of the contents of the block diagram shown in FIG. 1.

The detailed construction and operation of the electronic timer circuit of FIG. 1 will be described with reference to a circuit diagram thereof shown in FIG. 2. As shown in FIG. 2, a resistor $R_1$ and a capacitor $C_1$ connected in series, constitute the first RC time constant circuit. Signals are derived from both terminals of the capacitor $C_1$. Transistors $T_1$ and $T_2$ constitute the first start control circuit which is controlled by the collector potential of a transistor $T_{12}$ which forms a part of the second hold circuit. PNP and NPN transistors $T_3$ and $T_4$ form a positive feedback circuit which function as the first level detecting circuit and as the first trigger circuit. When the emitter potential of the transistor $T_3$ rises above the base potential, which is determined by the voltage division of resistors $R_2$ and $R_3$, the collector potential of the transistors $T_4$ is immediately dropped to zero due to the positive feedback of the transistor $T_4$. Simultaneously the emitter potential of the transistor $T_5$, which forms a part of the first hold circuit, is triggered. The transistor $T_5$ serves to detect the level of the collector potential of the transistor $T_4$ and is turned on when its emitter potential drops below its base potential, which is determined by the voltage division of resistors $R_4$ and $R_5$. Transistors $T_7$ and $T_8$ are connected in series to the base of an output transistor $T_9$ and constitute the AND circuit and also define a part of the first hold circuit. The base of the transistor $T_6$ is connected through a resistor to the collector of the transistor $T_7$ and the collector of the transistor $T_6$ is connected to the emitter of the transistor $T_5$ so that positive feedback is applied to the emitter of the transistor $T_5$ to which is also applied the trigger signal. The transistors $T_5$, $T_6$ and $T_7$ constitute the first hold circuit. A transistor $T_{10}$, whose base is connected through a resistor to the collector of a transistor $T_{12}$, serves as a phase inverter for the input signal to the transistor $T_8$ in the AND circuit.

Transistors $T_{11}$, $T_{12}$ and $T_{13}$ constitute the second hold circuit having positive feedback. A transistor $T_{14}$ serves as the second start control circuit and is controlled in response to the collector potential of the transistor $T_5$. Transistors $T_{15}$ and $T_{16}$ constitutes the second level detecting and trigger circuit with positive feedback. Series connected resistor $R_{10}$ and capacitor $C_2$ constitute the second RC time constant circuit, and the charging signals thereof are derived from both terminals of the capacitor $C_2$.

The magnitudes of all resistors, except the resistors $R_1$ and $R_{10}$, are selected so as to permit all of the transistors to operate in their saturation region. More specifically, the magnitudes of the resistors $R_2 - R_9$ are so selected as to satisfy the following conditions:

$R_2/R_3 < R_4/R_5$, and $R_8/R_9 < R_6/R_7$

Referring still to FIG. 2, a SW1 is provided for connecting a power source E to each of the first and second timing circuits. SW2 is provided for interrupting the nonconduction mode as described hereinafter and SW3 is provided for interrupting the repetitive operation. SW4 is also provided for inserting of either the capacitors $C_3$ or $C_4$ so that the output in the timer circuit derived from the transistors $T_9$ in response to the make of the power switch SW1, is initiated from the conduction mode or non-conduction mode.

First, the repetitive operation or repeat mode of the electronic timer circuit will be described. In this case, the switch SW2 is closed; the switch SW3 is opened; and the switch SW4 is switched to the capacitor $C_4$ as shown in FIG. 2. When the power switch SW1 is closed, the transistor $T_5$ is turned off because its emitter potential is higher than its base potential because $R_2/R_3 < R_4/R_5$ and the value of the capacitor $C_4$. More specifically, initially the charge of the capacitor is zero so that it may be considered as being shortcircuited when the voltage is applied through the resistor. As a result, the transistor $T_{14}$ is also turned off because its base is connected through a resistor to the collector of the transistor $T_5$. The transistor $T_7$ in the first hold circuit and AND circuit, is also turned off because its base is connected through a resistor to the collector of the transistor $T_5$. The transistor $T_{12}$ is also turned off since $R_8/R_9 < R_6/R_7$. The transistors $T_{10}$, $T_{11}$ and $T_1$ are turned off because their bases are connected through resistors to the collector of the transistor $T_{12}$. Since the base current flows through a resistor connected to the collector of the transistor $T_{10}$ which is now turned off, the transistor $T_8$ is turned on. Since the transistor $T_7$ is turned off and the transistor $T_8$ is turned on, the transistor $T_9$ is turned off. Since the base current flows through a resistor connected to the collector of the transistor $T_1$ which is turned off, the transistor $T_2$ is turned on so that the integration by the resistor $R_1$ and the capacitor $C_1$ is initiated. The above described condition will be referred to as the initial condition in which the first time constant circuit is about to initiate the integration, and both of the level detecting and trigger circuit consisting of the transistors $T_3$ and $T_4$ and the first hold circuit consisting of the transistors $T_5$, $T_6$ and $T_7$ are turned off so that the operation may be started.

Figure 3:
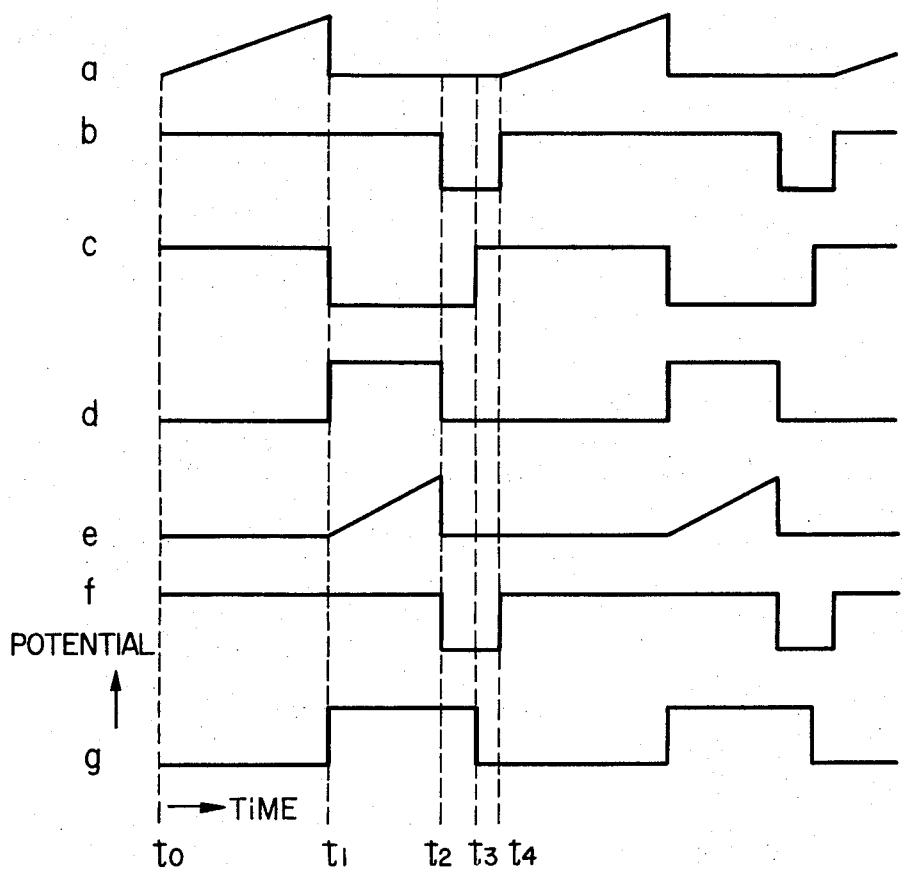
FIG. 3 shows voltage waveforms or potential levels at certain electrodes in the circuit diagram of FIG. 2.

Various potentials under this initial condition are shown at $t_0$ in FIG. 3 wherein $a$ designates the emitter potential of the transistor $T_3$; $b$, the collector potential of the transistor $T_2$; $c$, the emitter potential of the transistor $T_5$; $d$, the collector potential of the transistor $T_8$; $e$, the emitter potential of the transistor $T_{15}$; $f$, the emitter potential of the transistor $T_{12}$; and $g$, the collector potential of the transistor $T_{14}$. These potentials are those in the repetitive operation or repeat mode. The time interval between $t_2$ and $t_4$ shown in FIG. 3 is exaggerated because this time interval is extremely shorter than time intervals between $t_0$ and $t_1$ and $t_1$ and $t_2$ as will be described in more detail hereinafter.

After a predetermined time from the initial condition, that is when the emitter potential of the transistor $T_3$ which is determined by the first RC time constant circuit consisting of the resistor $R_1$ and $C_1$ becomes higher than the base potential which is determined by the voltage division by the resistors $R_2$ and $R_3$, the current flows through the base of the transistor $T_3$. This current flow causes that the collector potential of the transistor $T_4$, that is the potential determined by the voltage division by the resistors $R_2$ and $R_3$ to become immediately almost zero due to the positive feedback of the transistor $T_4$. The emitter potential of the transistor $T_5$ drops lower than its base potential which is determined by the voltage division by the resistors $R_4$ and $R_5$ so that the transistor $T_5$ is turned on. As a consequence, the collector potential of the transistor $T_5$ drops to zero so that the transistors $T_7$ and $T_{14}$ are turned on. When the transistor $T_7$ is turned on, its collector potential becomes almost equal to that of the power source and the transistor $T_8$ is on so that the base current of the transistor $T_9$ flows, whereby the transistor $T_9$ is turned on. The base of the positive feedback transistor $T_6$ is connected through a resistor to the collector of the transistor $T_7$, the transistor $T_6$ is turned on so that the emitter potential of the transistor $T_5$ is held at zero potential until the transistor $T_2$ is turned off. The above condition will be referred to as the timing-operation-end mode in which the transistors $T_5$, $T_6$ and $T_7$ are all turned on; the trigger signal is stored by the transistors $T_3$ and $T_4$ until the transistor $T_2$ is turned off; the emitter of the transistor $T_5$ is held at zero potential so that the transistors $T_3$ and $T_4$ remain conducting; and since the base potential of the transistor $T_3$ is zero and the current flows through the resistor $R_1$, the voltage across the capacitor $C_1$ is held at the emitter-base saturation voltage. In addition, the transistor $T_{14}$ is turned on so that the second time constant circuit consisting of the resistor $R_{10}$ and the capacitor $C_2$, the second trigger circuit and the second hold circuit are actuated. In this case, the potential levels are shown at $t_1$ in FIG. 3.

After a predetermined time when the emitter potential of the transistor $T_{15}$ which is determined by the second RC time constant circuit consisting of the resistor $R_{10}$ and the capacitor $C_2$ becomes higher than the base potential which is determined by the voltage division by the resistors $R_8$ and $R_9$, the emitter potential of the transistor $T_{12}$ is made zero through the second level detecting and trigger circuit with the positive feedback consisting of the transistors $T_{15}$ and $T_{16}$. As a result, the transistor $T_{12}$ is turned on so that the transistors $T_1$, $T_{10}$ and $T_{11}$, whose bases are connected through resistors to the collector of the transistor $T_{12}$, are turned on. Because the transistor $T_{11}$ is turned on, the transistor $T_{13}$ is turned on and the emitter potential of the transistor $T_{12}$ is held at zero until the transistor $T_{14}$ is turned off. Since both of the transistors $T_1$ and $T_{10}$ are turned on so that the base potentials of the transistors $T_2$ and $T_8$ become equal to that of the power source, the transistors $T_2$ and $T_8$ are turned off. As a consequence, the transistor $T_9$ is turned off. Thus, the second timing circuit is now in the timing-operation-end mode and the potentials are shown at $t_2$ in FIG. 3.

When the transistor $T_2$ is turned off, the first hold circuit is returned to its initial condiction, but the voltage across the capacitor $C_1$ is held at the emitter-base saturation voltage because the base potential of the transistor $T_3$ is zero during the time interval between $t_1$ and $t_2$ and the current flows across the emitter-base of the transistor $T_3$. Therefore, even when the transistor $T_2$ is turned off, the collector potential of the transistor $T_4$ will not be immediately returned to the potential determined by the voltage division by the resistors $R_2$ and $R_3$ because of the remaining charge of the capacitor $C_1$. The capacitor $C_1$ is discharged through the emitter of the transistor $T_3$ and the current flowing from the collector of the transistor $T_3$ to the base of the transistor $T_4$ is gradually reduced. Finally, when the positive feedback becomes ineffective, the collector potential of the transistor $T_4$ is returned to the potential determined by the voltage division of the resistors $R_2$ and $R_3$. Because of the phenomenon described above, there is a time interval between the time the transistors $T_2$ and $T_5$ are turned off. When the transistor $T_5$ is turned off, the transistor $T_{14}$ is also turned off. The potential levels in this case are shown at $t_3$ in FIG. 3.

When the transistor $T_{14}$ is turned off, the second hold circuit is returned to its initial condition. In this case, when the capacitor $C_2$ is discharged so that the positive feedback is not applied by the transistor $T_{16}$, its collector potential returns to the level determined by the voltage division of the resistors $R_8$ and $R_9$. The transistor $T_{12}$ is turned off a short time interval after the transistor $T_{14}$ is turned off, so that the transistor $T_1$ is turned off whereas the transistor $T_2$ is turned on. In this case, the potential levels are shown at $t_4$ in FIG. 3. It is seen that the potential levels at $t_4$ are equal to those at $t_0$. Unless the power switch SW1 is opened, the above described operation from $t_o$ to $t_4$ is cycled so that the transistor $T_9$ is alternately turned on and off whereby the output is intermittently derived from its collector.

Next, the mode of operation in which the circuit or transistor $T_9$ is turned on immediately when the power switch SW1 is closed and is turned off after a predetermined time will be described. In this case, the switch SW2 is closed; the switch SW3 is opened; and switch SW4 is switched to the capacitor $C_3$. This mode of operation is similar to the repeat mode described hereinabove except that upon the closure of the power switch SW1, the transistor $T_9$ is immediately turned on and is turned off after a predetermined time.

When the power switch SW1 is closed, the base potential of the transistor $T_5$ becomes for a short time, higher than the emitter potential because of the capacitor $C_3$ connected in parallel with the resistor $R_4$ so that the transistor $T_5$ is turned on. As a consequence, the base potential of the transistor $T_3$ is held at zero potential by the first hold circuit with the positive feedback which consists of the transistors $T_7$ and $T_6$. Since the transistors $T_7$ and $T_6$ are turned on, the transistor $T_9$ is turned on. In addition, the transistor $T_{14}$ is turned on. Thus, the second time constant circuit, the second level detecting and trigger circuit and the second hold circuit are actuated. The potential levels are shown at $t_1$ in FIG. 3.

The capacitor $C_3$ only determines the instanteous condition when the power switch SW1 is closed, but will not influence the mode of operation thereafter so that only the operation sequence from $t_2$ to $t_4$ is cycled.

Next, the mode of operation in which the transistor $T_9$ remains non-conducting for a predetermined time after the power switch SW1 is closed, is turned on for a predetermined time, turned off and thereafter remains in the non-conduction state will be described. In this case, both of the switches SW2 and SW3 are closed and the switch SW4 is switched to the capacitor $C_4$. Since the switch SW3 is connected in parallel with the emitter-collector of the transistor $T_2$ in the first start control circuit, when the switch SW3 is closed, the first RC time constant circuit, the first level detecting and trigger circuit and the first hold circuit remain actuated even when the transistor $T_2$ is turned off, so that the repeat mode is not initiated. The potential levels are shown at $t_0$ in FIG. 3 when the power switch SW1 is closed and thereafter the timer circuit follows the sequence from $t_1$ to $t_2$. Because the transistor $T_2$ is short-circuited by the switch SW3, the return signal from the transistor $T_{12}$ is not transmitted to the first RC time constant circuit so that both of the first and second hold circuits remain positively energized. As a result, the condition at $t_2$ continues until the power switch SW1 is opened.

Next the mode of operation in which when the power switch SW1 is closed, the transistor $T_9$ is turned on for a predetermined time, and then turned off and remains in the non-conduction state will be described. In this case, both of the switches SW2 and SW3 are closed and the switch SW4 is switched to the capacitor $C_3$. Since the transistor $T_2$ is short-circuited by the switch SW3, the return signal which is generated when the transistor $T_{12}$ is turned on is not transmitted to the first time constant circuit. Since the switch SW4 is switched to the capacitor $C_3$, when the power switch SW1 is closed, the transistors $T_5$, $T_6$, $T_7$ and $T_{14}$ are turned on so that the transistor $T_9$ is turned on, whereby the output is derived. The potential levels at this stage are indicated at $t_1$ in FIG. 3. Thereafter the timing circuit follows the sequence up to the time $t2$ in which the second timing circuit is in the timing-operation-end mode. However, even when the transistor $T_{12}$ is turned on while the transistor $T_9$ is turned off, the return signal is not transmitted to the first start control circuit because the transistor $T_2$ is short-circuited by the switch SW3. As a consequence both of the first and second hold circuits may be positively maintained in their hold modes so that the condition at $t_2$ continues until the switch SW1 is opened.

Lastly, the mode of operation in which the transistor $T_9$ is turned on a predetermined time after the main switch SW1 is closed and remains conducting until the switch SW1 is opened will be described. In this case, the switch SW2 is opened; the switch SW3 is opened or closed; and the switch SW4 is switched to the capacitor $C_4$. Since the switch SW2 is opened, the second timing circuit is not actuated even when the transistors $T_5$ and $T_{14}$ are turned on. That is, the transistor $T_8$ is normally turned on so that the transistor $T_9$ is turned on or off in response to the mode of the transistor $T_7$. Since the second timing circuit is not actuated, no return signal is generated from the transistor $T_{12}$ so that once the first timing circuit is brought into the timing-operation-end mode, this mode may be maintained until SW1 is opened. When the main switch SW1 is closed, the potential levels are those shown at $t_0$ in FIG. 3 because the switch SW4 is connected to the capacitor $C_4$. After predetermined time which is determined by the first time RC constant circuit, the first level detecting circuit and the first trigger circuit, the transistor $T_5$ is turned on whereby the transistor $T_9$ is also turned on. Since the transistor $T_5$ is maintained in the conduction state as described above, the transistor $T_9$ is also maintained in the conduction state until the power switch SW1 is opened.

From the foregoing description it will be seen that the electronic timer of the present invention provides various electrical switching signals for various devices, such as movie cameras incorporating an electromagnet release, motor-driven still cameras, electromagnetic trigger devices of the type for electrically actuating the shutter release button of a camera, and like camera devices which are turned on and off in response to these switching signals so that repetitive or repeat photography, a time-limited photography photography with a long exposure time by the bulb, timedelayed photography for photographing for a predetermined time after a predetermined time-delay and the like may be automatically, simply and positively carried out in a very reliable manner.

What is claimed is:

1. An electronic timer for actuating a camera comprising:
    a. first and second timing circuits each timing circuit comprising:
        i. a charging circuit,
        ii. a level detecting and trigger circuit responsive to said charging circuit for determining when said charging circuit reaches a predetermined charging level,
        iii. a hold circuit responsive to said level detecting and trigger circuit for maintaining said charging circuit and level detecting and trigger circuit in their predetermined modes of operation;
    b. a first start control circuit connected to said first timing circuit for starting and interrupting its operation in response to said second timing circuit,
    c. a second start control circuit connected to said second timing circuit for starting and interrupting its operation in response to said first timing circuit, and
    d. a combining circuit responsive to output signals from said first and second hold circuits for providing an actuating output for controlling said camera.

2. An electronic timer as in claim 1 further comprising means for selectively disabling said first start control circuit, whereby said combining circuit provides a single actuating output having a predetermined time interval.

3. An electronic timer as in claim 1 further comprising means for selectively disabling said second start control circuit, whereby said combining circuit provides an actuating output suitable for long time control of said camera.

4. An electronic timer for actuating camera comprising:
    a. first and second timing circuits, each timing circuit comprising
        i. an integration time constant circuit consisting of a resistor and a capacitor,
        ii. a level detecting circuit coupled to the time constant circuit for generating an output signal when the voltage across said capacitor in said time constant circuit reaches a predetermined level, iii. a trigger circuit coupled to said level detecting circuit for generating a trigger signal in response to the output of said level detecting circuit, and iv. a hold circuit associated with said trigger circuit for storing said trigger signal and maintaining said time constant circuit, said level detecting circuit and said trigger circuit in their predetermined modes of operation;

b. a first start control circuit interconnected between said first timing circuit and means connected to a power source to supply the power to said first timing circuit, said first start control circuit including means for connecting and interrupting the power supply from said power source to said first timing circuit in response to an output signal from said second timing circuit, thereby controlling said first timing circuit;

c. a second start control circuit interconnected between said second timing circuit and means connected to a power source to supply the power to said second timing circuit, said second start control circuit including means for connecting and interrupting the power supply from said power source to said second timing circuit in response to the output signal from said first timing circuit, thereby controlling the said second timing circuit; and d. a combining circuit adapted to generate an actuating output signal in response to the output signals from said first and second hold circuits.

5. An electronic timer as in claim 3 further comprising means for selectively disabling said first start control circuit, whereby said combining circuit provides a single actuating output having a predetermined time interval.

6. An electronic timer as in claim 4 further comprising means for selectively disabling said second start control circuit, whereby said combining circuit provides an actuating output suitable for long time control of said camera.

7. An electronic timer as in claim 4 further comprising means for selectively producing said actuating output upon connection of said first timing circuit to said power source.

8. An electronic timer for actuating camera comprising:

a. first and second timing circuits, each timing circuit comprising
  i. an integration time constant circuit consisting of a resistor and a capacitor,
  ii. a level detecting circuit coupled to the time constant circuit for generating an output signal when the voltage across said capacitor in said time constant circuit reaches a predetermined level,
  iii. a trigger circuit coupled to said level detecting circuit for generating a trigger signal in response to the output of said level detecting circuit, and
  iv. a hold circuit associated with said trigger circuit for storing said trigger signal and maintaining said time constant circuit, said level detecting circuit and said trigger circuit in their predetermined modes of operation;

b. a first start control circuit interconnected between said first timing circuit and means connected to a power source to supply the power to said first timing circuit, said first start control circuit including means for connecting and interrupting the power supply from said power source to said first timing circuit in response to an output signal from said second timing circuit, thereby controlling said first timing circuit;

c. a second start control circuit interconnected between said second timing circuit and means connected to a power source to supply the power to said second timing circuit, said second start control circuit including means for connecting and interrupting the power supply from said power source to said second timing circuit in response to the output signal from said first timing circuit, thereby controlling the said second timing circuit; and d. an AND circuit adapted to generate an actuating output signal in response to the output signals from said first and second hold circuits, e. said first timing circuit including means for generating during operation the first time constant circuit an OFF signal to be applied to said second start control circuit;

f. said first timing circuit upon reaching the timing-operation-end mode including means for establishing the output of said first hold circuit to be applied to one input terminal of said AND circuit at "0", said second hold circuit simultaneously including means for establishing a control signal applied to said first start control circuit at "ON" and said second hold circuit having means establishing the output applied to the other terminal of said AND circuit at "1", said first hold circuit having means for establishing the output to be applied to said second start control circuit at "ON" signal so that the said second timing circuit is activated;

g. said second time constant circuit during integration operation including means for establishing the output signal of said first hold circuit to be applied to said one input terminal of said AND circuit at "1", said second hold circuit simultaneously including means for establishing a control signal to be applied to said first control circuit at "ON" so that said first timing circuit is maintained in said timing-operation-end mode;

h. said second timing circuit upon reaching the timing-operation-end mode including means for establishing the output of said second hold circuit to be applied to said the other input terminal of said AND circuit at "1", said second hold circuit including means for establishing the control signal to be applied to said first start control circuit at "OFF" so that said first start control circuit is turned off, whereby said first timing circuit is returned to its initial condition and remains in this condition; and i. said second start control circuit upon being turned off including means for establishing the control signal from said first hold circuit to said second start control circuit at "OFF", and said first hold circuit simultaneously including means for establishing a control signal applied to said one input terminal of said AND circuit at "0", said second timing circuit being returned to its initial condition so that the control signal from said second hold circuit to said first start control circuit is the "ON" control signal and the output of said second hold circuit to be applied to the other input terminal of said AND circuit is "1", whereby said first start control circuit is turned on thereby initiating said integration in said initial condition to repeat the operation of the timer in said sequence.

9. An electronic timer as in claim 8 further comprising means for selectively disabling said first start control circuit, whereby said combining circuit provides a single actuating output having a predetermined time interval.

10. An electronic timer as in claim 8 further comprising means for selectively disabling said second start control circuit, whereby said combining circuit provides an actuating output suitable for long time control of said camera.

* * * * *